United States Patent [19]

Pinckaers et al.

[11] 4,347,974

[45] Sep. 7, 1982

[54] TEMPERATURE CONTROL SYSTEM WITH NIGHT SETBACK PROGRAMMING AS A FUNCTION OF TEMPERATURE CONDITIONING LOAD

[75] Inventors: B. Hubert Pinckaers, Edina; Robert T. Ruminsky, Bloomington, both of Minn.

[73] Assignee: Honeywell, Inc., Minneapolis, Minn.

[21] Appl. No.: 240,741

[22] Filed: Mar. 5, 1981

[51] Int. Cl.³ .................. F23N 5/20; G05D 23/00
[52] U.S. Cl. .................... 236/46 R; 236/47; 165/12
[58] Field of Search ............... 236/46 R, 47; 165/12

[56] References Cited

U.S. PATENT DOCUMENTS

| | | |
|---|---|---|
| 3,102,689 | 9/1963 | Ditto . |
| 3,311,303 | 3/1967 | Noyes . |
| 3,933,197 | 1/1976 | Zimmer et al. . |
| 3,964,676 | 6/1976 | Rooks et al. . |
| 3,979,059 | 9/1976 | Davis et al. . |
| 4,020,897 | 5/1977 | Enter . |
| 4,049,045 | 9/1977 | Moog et al. . |
| 4,172,555 | 10/1979 | Levine ............... 236/47 X |
| 4,174,807 | 11/1979 | Smith et al. ......... 165/12 X |
| 4,186,315 | 1/1980 | Benton . |
| 4,193,006 | 3/1980 | Kabat et al. . |
| 4,196,356 | 4/1980 | Kabat . |

OTHER PUBLICATIONS

Honeywell Brochure Form No. 60-2470-Microelectronic Fuel Saver Thermostat, T800A, B.

Primary Examiner—William E. Wayner
Attorney, Agent, or Firm—Clyde C. Blinn

[57] ABSTRACT

A temperature control system for a building has a temperature responsive means or thermostat in the space for controlling a temperature conditioning apparatus furnishing temperature condition medium to the space. A time control apparatus provides for a reduction or deviation of the space temperature during certain time periods for the purpose of energy conservation and/or comfort. The space temperature is restored to the normal temperature by a pickup operation. The magnitude of temperature setback initially selected or to be maintained during the setback time period is automatically adjusted by responding to the actual building heat load, so as to keep the time and heating capacity needed to restore the space to the normal temperature within certain limits.

6 Claims, 7 Drawing Figures

TIME PERIOD VARIES
WITH PERCENTAGE LOAD

WILL NOT LET COUNTER
START UNTIL IN SETBACK

TEMPERATURE CONTROL SYSTEM WITH NIGHT SETBACK PROGRAMMING AS A FUNCTION OF TEMPERATURE CONDITIONING LOAD

BACKGROUND AND SUMMARY OF THE INVENTION

For many years temperature control systems for homes and buildings have had provisions for setting back the temperature in the building for energy conservation and/or comfort during certain periods of time such as at night. Such systems have had various provision or control apparatus for restoring the temperature in the building after the setback time period. As the temperature conditioning load increases during the setback time period, the building temperature will drop much lower. The scheduling to bring the temperature back to normal, that is the pickup scheduling, will have to take into consideration that the lower the building temperature, the larger the pickup load is to restore the building temperature to the normal daytime temperature.

With the use of certain temperature conditioning apparatus, such as a refrigeration heat pump, a large pickup load requires auxiliary heating equipment such as electrical strip heat. In the interest of economy, the use of electrical strip heat may not be desirable. For that reason, as well as other reasons, such as the length of the pickup time, the possible equipment wear, capacity of the equipment, occupancy comfort, and efficiency, there became a need to limit the setback temperature under certain load conditions.

The present invention is concerned with a temperature control system having a building temperature conditioning load responsive apparatus for providing a signal to modify the amount of temperature deviation or setback and/or adjust the amount of setback throughout a selected setback time period in response to the building temperature conditioning load whereby, upon a pickup of the load to restore the temperature in a space back to normal, the pickup load is maintained within certain limits.

DESCRIPTION OF THE PREFERRED EMBODIMENT

Figure 1:
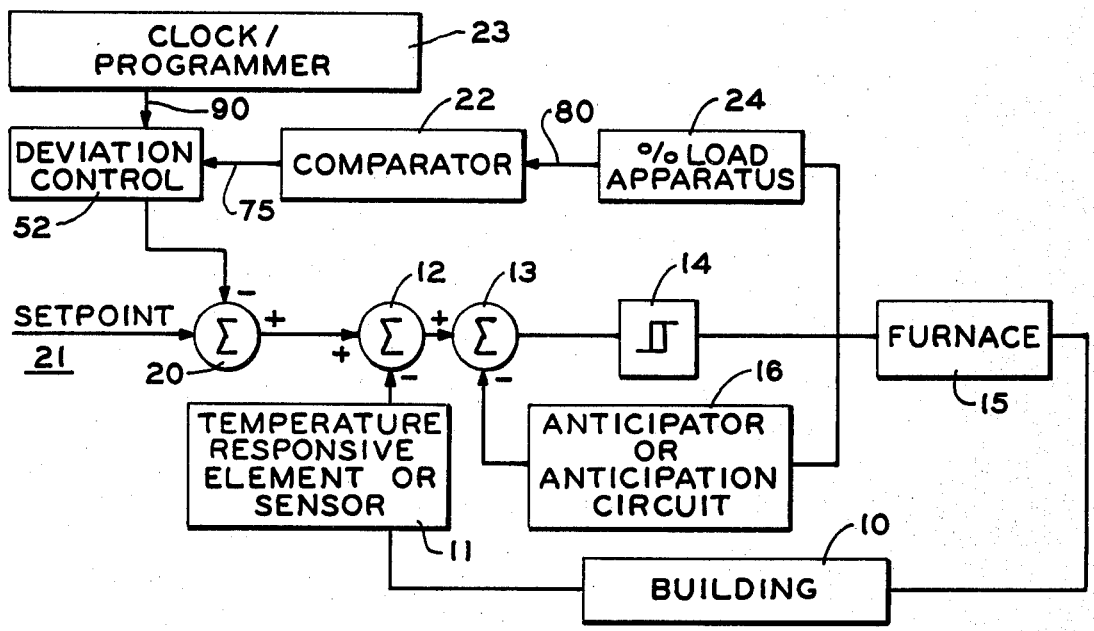
FIG. 1 is a schematic representation of the temperature control system.

Referring to FIG. 1, an electrical and thermodynamic flow diagram of the basic control system is shown in which a building or house 10 is having its temperature controlled. A building condition responsive element or temperature responsive sensor 11 is connected to an electrical signal summing network 12 to provide an output to a second summing network 13 providing an output to a control apparatus 14 which provides an output for controlling the operation of a temperature conditioning apparatus or furnace 15. The system has a conventional anticipation circuit or anticipator 16 as disclosed in the John L. Kabat U.S. Pat. No. 4,196,356, issued Apr. 1, 1980, and/or the Ronald Benton Pat. No. 4,186,315, issued Jan. 29, 1980. The feedback signal from the anticipation circuit 16 is summed in the summing network 13 to modify the signal from sensor 11.

Connected to a summing network 20 is a setpoint output signal from a temperature setpoint adjustment or temperature selecting apparatus 21 (not shown) to be compared with the output of temperature responsive sensor 11 to provide the control input signal. The setpoint signal is modified as a function of the percent of on-time of the system which is sensed by load apparatus 24, comparator 22, deviation control 52, and the user programmed times stored in clock programmer 23.

Figure 2:
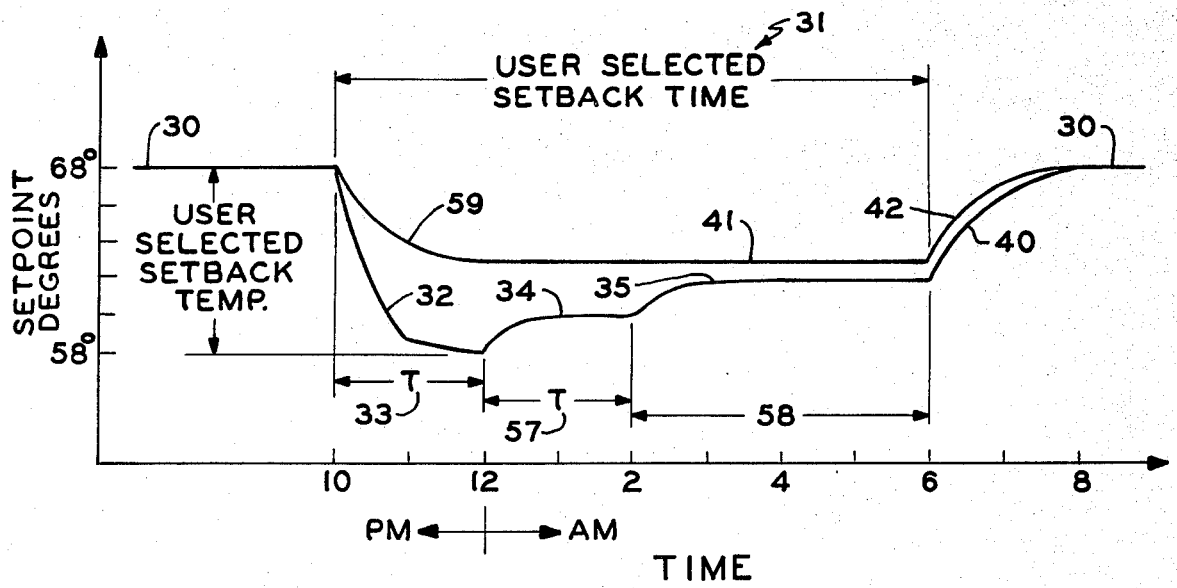
FIG. 2 is a graphical representation of the operation of the control system showing the setback temperature as controlled or adjusted during the setback time period.

The operation of the system of FIG. 1 is graphically shown in FIG. 2 wherein the normal temperature being controlled by the thermostat setpoint signal 21 is shown at 30 to be 68°. During a selected setback time period 31 which is between the hours of 10:00 P.M. and 6:00 A.M., the temperature is set back in various degrees as shown by the two curves. The first curve 32 shows the setback being reduced to 58°, and then at a time period greater than 33, an adjustment is made to the setback temperature as shown at 34, and a second adjustment is made shown at 35. At the end of the setback time 31, a pickup at 40 is shown to bring the temperature back to the normal daytime temperature of 68°. A second curve 59 is shown whereby the setback temperature is not as great as the temperature only drops as shown at 41 to 63° F. and a pickup curve is shown at 42.

Figure 3A:
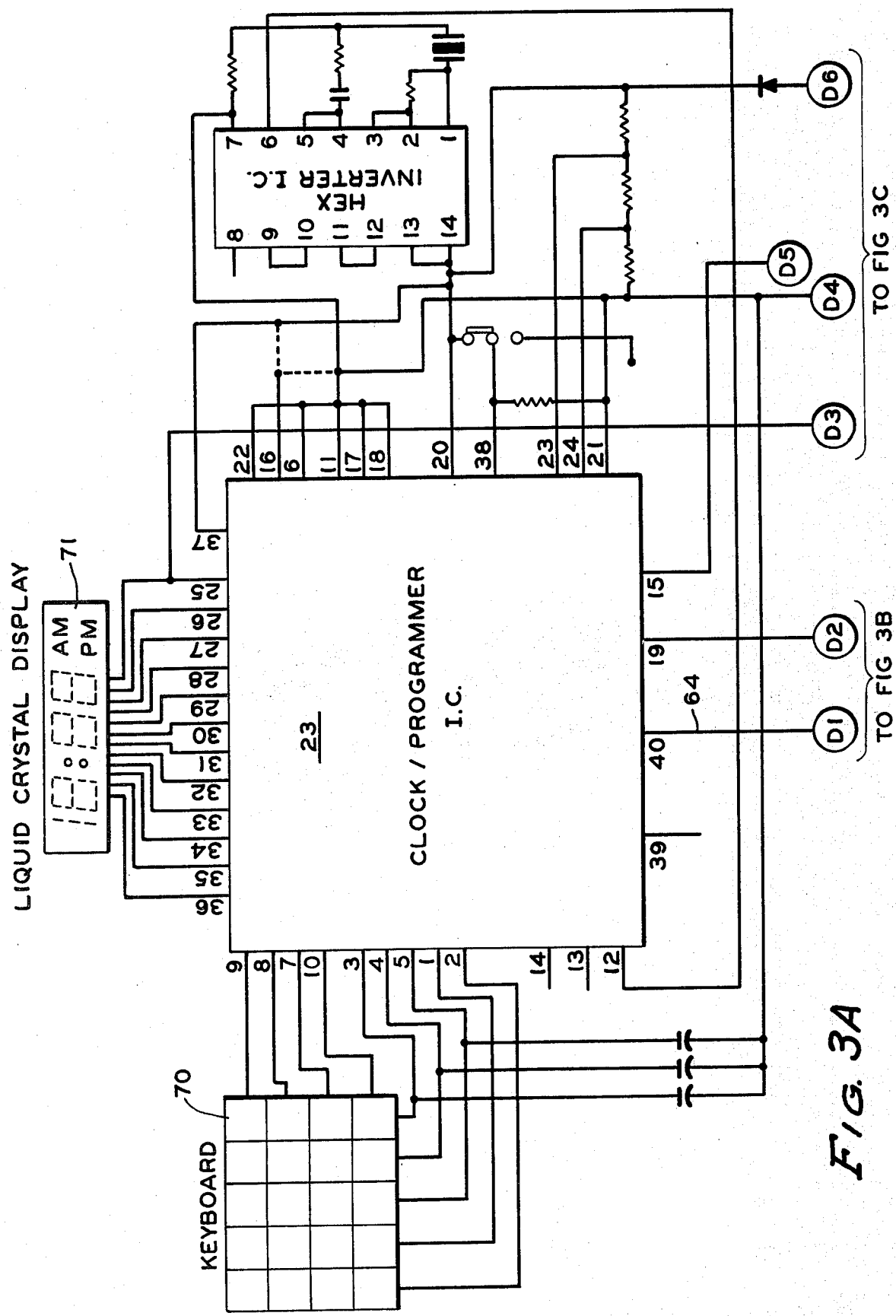
FIGS. 3A, B and C is a circuit of the temperature conditioning apparatus of the present invention.
Figure 3B:
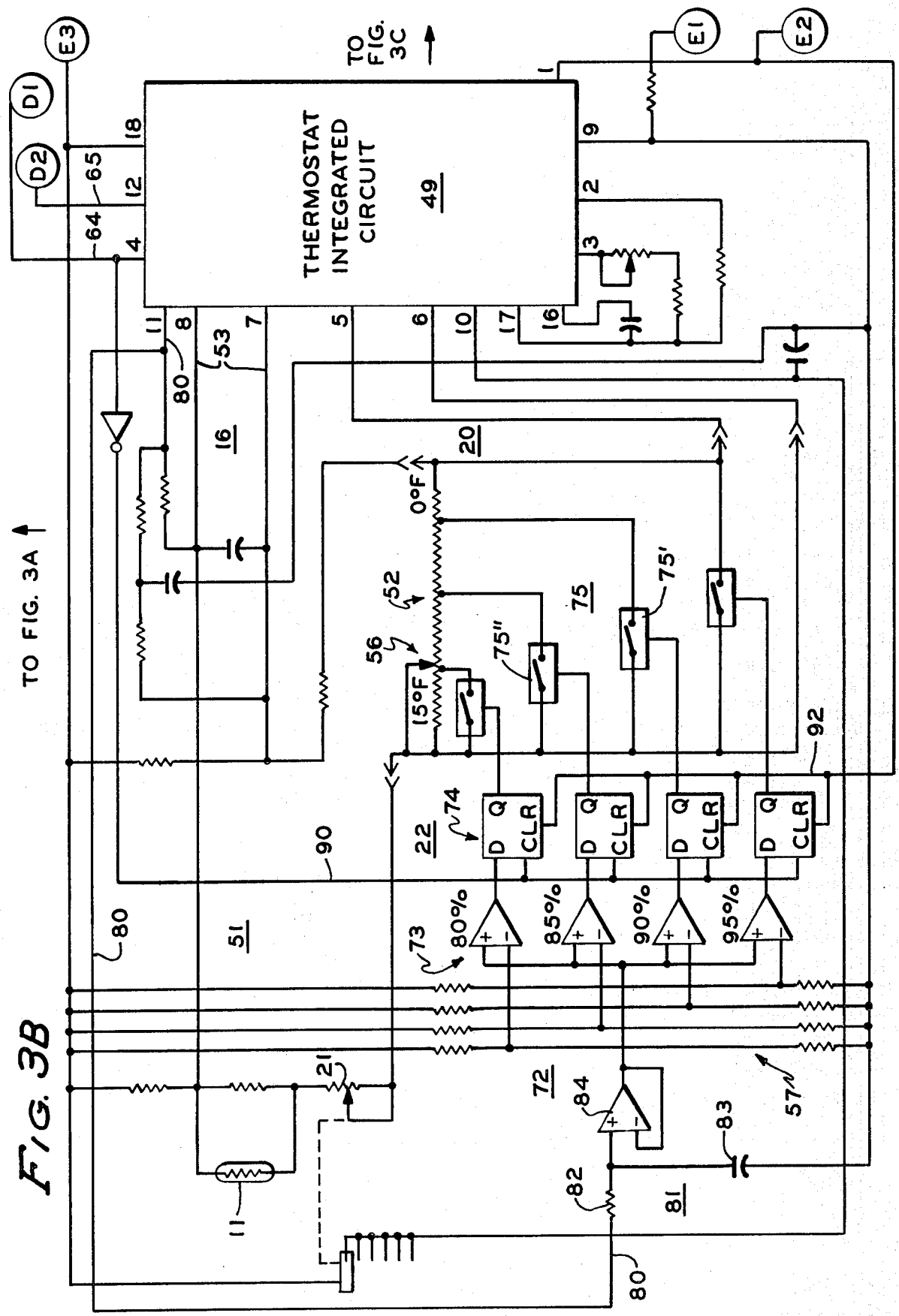
Figure 3C:
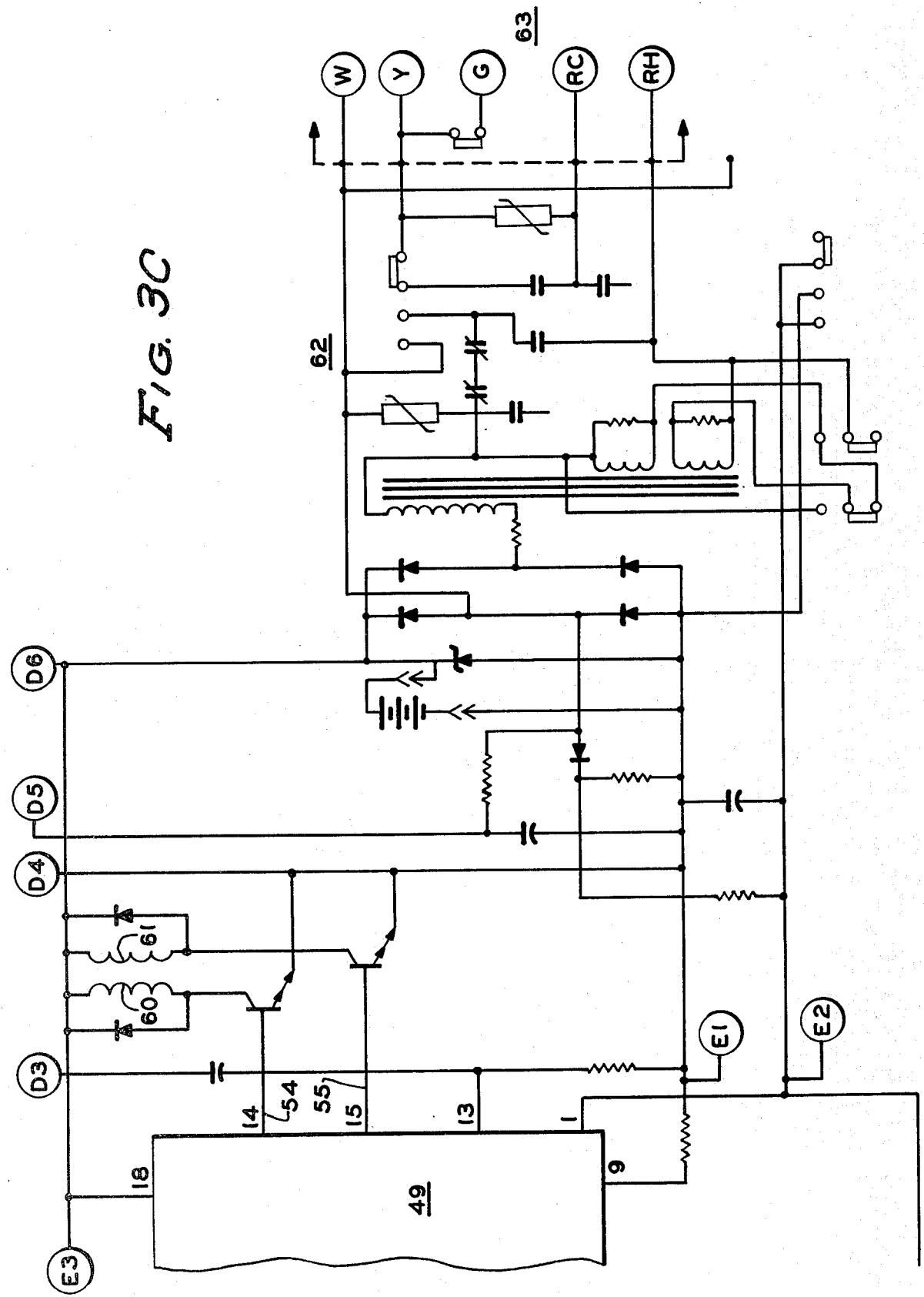

Referring to FIG. 3, a circuit diagram discloses the various components of the system shown in the diagram of FIG. 1. With the exception of certain modifications made to incorporate the present invention, temperature control system of FIG. 3 is substantially as used in the T800A, B, Microelectronic Fuel Saver Thermostat manufactured and sold by Honeywell Inc. Specifically, referring to FIG. 3B, a bridge circuit 51 contains a temperature responsive resistance element 11, a setpoint or temperature adjustment potentiometer 21, a resistance element at 52 for providing for a deviation of the temperature to be controlled, and an anticipation circuit 16 receiving a signal from pin 11 of the thermostat integrated circuit 49. The output of bridge circuit 51 is connected to pins 7 and 8 of thermostat integrated circuit 49 at 53 to provide an output at pins 14 and 15 on conductors 54 and 55 in FIG. 3C for controlling conventional relays 60 and 61. The relays are connected to associated switches in the output and power supply circuit 62 for providing a conventional output at 63 to control the temperature conditioning apparatus or furnace 15.

Associated with the thermostat integrated circuit 49 is a clock and programmer integrated circuit 23 as shown in FIG. 3A to provide an output at 64 to the thermostat circuit. The output schedules the controlled temperature in accordance with a selected time schedule as can be programmed into the memory of the clock-programmer 23 by using the keyboard 70 and liquid crystal display 71.

Figure 4:
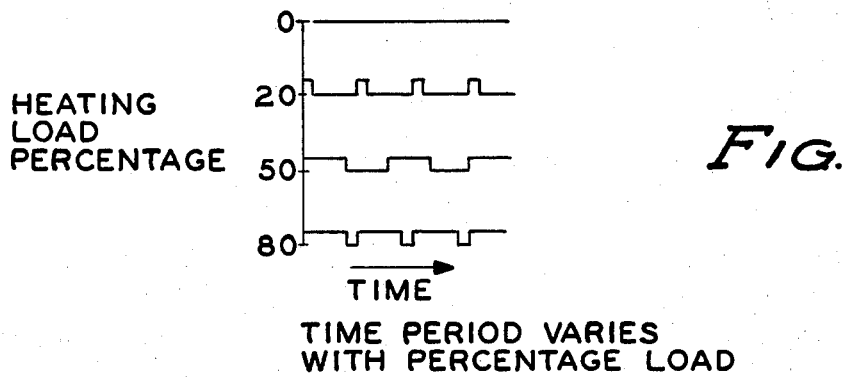
FIG. 4 is a graphical representation of the output of the building load responsive apparatus.

Referring to FIG. 3B, comparator 22 has a voltage dividing circuit connected to a plurality of threshold detectors 73 providing inputs to a plurality of conventional D flip-flops 74 for controlling a plurality of switches in a switching circuit 75 connected to resistance element 52 for selecting the deviation. Comparator 22 has an input to an integrator 81 over conductor 80 from pin 11 of thermostat integrated circuit 49. The output of the thermostat integrated circuit is a pulsing output having a time period indicative of the building heating load as shown in FIG. 4. This pulsing output is also used in the anticipation circuit 16 which was described in the previously mentioned Kabat and Benton patents.

By means of the integrator circuit 81 comprising the resistance 82 and capacitor 83, a DC voltage indicative of the heating load of the building is connected to buffer 84 to provide the input to each of the four threshold detectors at 73.

A second input is provided to the comparator 22 on conductor 90 from clock-programmer 23 depending upon whether the schedule is in the high or low temperature setting of the time-temperature program. At the time the schedule initiates the setback program, a voltage transition is applied to conductor 90 to activate the D flip-flop 74 whereby upon any one of the latches receiving a signal from a threshold detector 73, its associated switch at 75 is operated to change the resistance at 52. Another input to the bank of D flip-flop 74 is available over conductor 92 from the thermostat integrated circuit depending upon whether the system is in the heating or cooling mode. The signal on conductor 92 informs comparator 22 that some level of deviation selected at resistance 52 is needed for a heating operation and not for a cooling operation.

Figure 5:
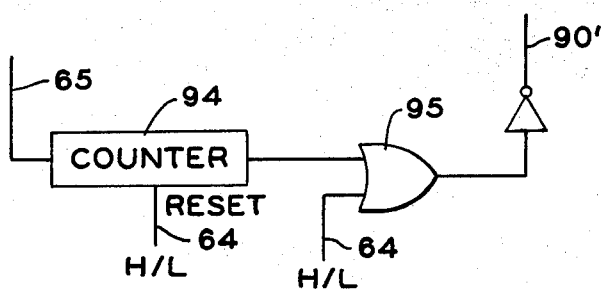
FIG. 5 is a specific modification of the disclosure of FIGS. 3A, B and C.

Another modification of the invention is provided by use of the counter of FIG. 5 wherein counter 94 is connected to the output 65 of the thermostat integrated circuit which is a 10 second pulse source. Depending upon whether the temperature is in the high or deviation setback program, outputs are available from 64 to the counter 94 as well as to the gate 95, thus providing an input 90' to the D flip-flop 74. With such modification as shown in FIG. 5, the operation of D flip-flop will occur at periodic interims after initiation of the setback program, such as every two hours.

DESCRIPTION OF THE OPERATION OF THE INVENTION

Referring to FIG. 3, and assuming by means of the clock-programmer 23 and the associated keyboard 70 and display 71, a night setback program is stored in the memory of the control system similar to that shown in the diagram of FIG. 2 wherein the normal temperature is controlled up to 10:00 P.M. and then a setback or deviation in the controlled temperature is established until 6:00 A.M. in the morning. The amount of deviation or setback selected by the user for this example is shown as 10° and is manually selected by the position of the potentiometer wiper 56 to short out a portion of the resistance element 52. Obviously, if a 15° setback were desired, wiper 56 would be moved to the far left to not short out any of element 52.

During the time period prior to 10:00 P.M., the normal daytime temperature of 68° as selected by temperature setpoint potentiometer 21 is maintained by sensor 11 controlling the output of the thermostat control system at 63. Upon the low or setback time being reached, that is 10:00 P.M., a low temperature signal or setback signal is available from the clock programmer 23 over conductor 64 to provide a signal to the D flip-flop 74 over conductor 90 to make the D flip-flops being susceptible to a signal from any one of the detectors 73. At the same time, a signal at 80 indicative of the building load in the form of pulses as shown in FIG. 4 is available. Depending upon the building load, whether it be zero or 80 percent or higher, the length of the "ON" period of the pulses is greater. These "ON" pulses are applied to the integrator 81 and an average voltage is available through the buffer 84 to the threshold detectors 73. Depending upon the voltage available, one or more of the threshold detectors are energized, each of which is biased by the voltage divider circuit 57 to energize one or more of D flip-flops at 74 and thus switching units 75 to short out portions of the resistance element 52.

Assuming that the building operator programmed a 10° F. setback by potentiometer 56, if the building load was 90%, the building temperature would drop as shown in FIG. 2 as curve 59 as switch 75' closes to limit the setback to 5° F., shown at 41. At the end of the setback time, a pickup takes place as shown at 42.

In another case, assuming that the building operator programmed a 10° F. setback by potentiometer 56, if the building load was less than 80%, and the outdoor temperature was sufficiently low, the building temperature would drop as shown in FIG. 2 as curve 32.

The temperature in the building is reduced to the 10° during the time 33. If FIG. 3B is modified by FIG. 5, the output from counter 94 of FIG. 5 triggers the D flip-flops 74 each two hour time period which in turn causes the appropriate portion of resistor 52 to be shorted out by switches 75. During the time 33, the load on the building changed to 85% so that the input to the threshold detector 73 changed and a greater portion of the resistor 52 was shorted out by switch 75" to reduce the deviation and thus caused the control temperature to increase along the curve 34. Similarly, during the time period 57, another change in the building load took place to operate switch 75' and more of resistance 52 is shorted out to raise the temperature along curve 35. From this it is seen that, depending upon the building load, the setback temperature is changed; so that, during the final pickup time, which in this case, as seen in FIG. 2, is 6:00 A.M., the temperature rises back to the normal control temperature along the curve 40 within certain time limits.

Without the present invention, a 10° setback selected by the user with the potentiometer 56 would continue throughout the operation of the setback time and if the building load increased to make it more difficult to restore the normal temperature, such would in many cases result in a total energy loss and an extremely long pickup time period.

The embodiments of the invention in which an exclusive property or right is claimed are defined as follows:

1. An improvement in a temperature control system for a building in which a temperature responsive control means and time program means is adapted to control temperature conditioning apparatus to maintain a first temperature during a first predetermined time period and a second temperature during a second predetermined time period and after said second time period, said temperature control returns the temperature to said first temperature after a pickup time period, the improvement comprising, building temperature conditioning load responsive means having an output indicative of the building load, and means connecting said output to the temperature responsive means to adjust said temperature responsive control means to maintain said second temperature as a function of building load to maintain a predetermined pickup time period.

2. A temperature control system for a building for setting down the space temperature during certain time periods and providing for a pickup of the space temperature to a normal temperature in a predetermined time, comprising

- temperature responsive means adapted to be responsive to a space temperature in the building and having an adjustable control temperature means,
- control means adapted to control temperature conditioning apparatus for furnishing temperature conditioned medium to the building,
- means connecting said temperature responsive means to said control means for maintaining a first predetermined temperature in the space,
- timer means,
- building temperature conditioning load responsive means having an output signal indicative of building load, and
- means connecting said output signal and said timer means to said control means for changing said control temperature to be maintained in the space with said temperature responsive means to a second predetermined temperature during a selected time period depending upon the building temperature conditioning load.

3. The invention of claim 2, comprising second timer means responsively connected to said temperature responsive means for periodically changing said second predetermined temperature during said selected time period if said building temperature conditioning load changes to maintain a predetermined deviation between said first and second temperatures and thus a predetermined pickup time to restore said space temperature from said second temperature to said first temperature.

4. The invention of claim 2 wherein said temperature responsive means is a sensor which changes in resistance as its temperature changes connected in a bridge circuit having an adjustable resistance element for selecting said first temperature to be maintained in the space containing said sensor, said control means is an electronic circuit to which an output of said bridge circuit is connected, said electronic circuit has an output adapted to control heating apparatus, said time means is an electronic timer for programming at least one predetermined time period during which it is desired to reduce the temperature in the space, said building temperature conditioning load responsive means has a pulsing output which has longer pulses as the percent building load increases, and said means connecting comprises an integrator circuit means for integrating said pulsing output to provide a voltage indicative of building load and a switching circuit for switching certain portions of a resistance leg of said bridge circuit to change the control temperature of said temperature responsive means as building load changes during said predetermined period.

5. The invention of claim 4 comprising second timer means connected to said switching circuit to periodically activate said switching circuit in response to said voltage to revise said bridge circuit as the building load changes.

6. The invention of claim 2 comprising timer means connected to said means connecting to periodically adjust said second predetermined temperature to either higher or lower temperature as said output signal indicative of building load changes to maintain said second temperature during said selected time period at a level such that pickup to said first temperature in the most energy efficient manner for a predetermined building temperature conditioning load.

* * * * *